United States Patent
Macwan et al.

(10) Patent No.: US 8,862,674 B2
(45) Date of Patent: Oct. 14, 2014

(54) METHOD AND APPARATUS FOR MANAGING AN ELECTRONIC MESSAGING SYSTEM

(75) Inventors: Sanjay Macwan, Marlboro, NJ (US); Larry Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 853 days.

(21) Appl. No.: 12/627,523

(22) Filed: Nov. 30, 2009

(65) Prior Publication Data

US 2011/0131280 A1    Jun. 2, 2011

(51) Int. Cl.
*G06F 15/16* (2006.01)
*G06Q 10/10* (2012.01)

(52) U.S. Cl.
CPC .................................... *G06Q 10/107* (2013.01)
USPC .......................................................... 709/206

(58) Field of Classification Search
CPC .................................................... G06Q 10/107
USPC .......................................................... 709/206
See application file for complete search history.

(56) References Cited

U.S. PATENT DOCUMENTS

| | | | |
|---|---|---|---|
| 5,377,354 A | 12/1994 | Scannell et al. | |
| 5,619,648 A | 4/1997 | Canale et al. | |
| 5,872,925 A * | 2/1999 | Han | 709/206 |
| 6,339,784 B1 | 1/2002 | Morris et al. | |
| 7,007,067 B1 | 2/2006 | Azvine et al. | |
| 7,296,288 B1 | 11/2007 | Hill et al. | |
| 7,320,020 B2 | 1/2008 | Chadwick et al. | |
| 7,509,411 B1 | 3/2009 | Smith | |
| 7,543,053 B2 | 6/2009 | Goodman et al. | |
| 7,564,954 B2 | 7/2009 | Frifeldt et al. | |
| 7,593,995 B1 | 9/2009 | He et al. | |
| 2007/0106738 A1* | 5/2007 | Barnes et al. | 709/206 |
| 2010/0174784 A1* | 7/2010 | Levey et al. | 709/206 |

* cited by examiner

*Primary Examiner* — David X Yi
(74) *Attorney, Agent, or Firm* — Wolff & Samson, PC (57) ABSTRACT

A rating is received, from a first user of an electronic messaging system, pertaining to a use by a second user of a reply-to-all function provided by the electronic messaging system. An etiquette value associated with the second user is updated based on the rating. An access by the second user to the reply-to-all function is controlled based on the updated etiquette value associated with the second user. The electronic messaging system may comprise an email messaging system, for example. Systems and apparatus are also described.

16 Claims, 6 Drawing Sheets

METHOD AND APPARATUS FOR MANAGING AN ELECTRONIC MESSAGING SYSTEM

FIELD OF THE INVENTION

This specification relates generally to a method and apparatus for managing an electronic messaging system, and more particularly, to a method and apparatus for managing use of a reply-to-all function in an electronic messaging system.

BACKGROUND

Some users of electronic messaging systems, such as email messaging systems, experience inconvenience and aggravation due to overuse, or inappropriate use, by other users of a "reply-to-all" function provided by many such messaging systems. Overuse and inappropriate use by some users of the reply-to-all function can result in other users receiving unwanted messages or an undesirably large number of messages, requiring the recipients to expend time and resources to store the messages, read the messages and delete the messages.

SUMMARY OF THE INVENTION

The present inventors have recognized that there is a need for an improved method and apparatus for managing use of a reply-to-all function within an electronic messaging system. Accordingly, in one embodiment, an improved method for managing an electronic messaging system is provided. The method comprises receiving, from a first user of an electronic messaging system, a rating of a second user's use of a reply-to-all function provided by the electronic messaging system, and updating an etiquette value associated with the second user, based on the rating. The method further comprises controlling the second user's access to the reply-to-all function, based on the updated etiquette value. In some embodiments, the electronic messaging system is an email messaging system.

In one embodiment, controlling the second user's access to the reply-to-all function includes restricting the second user's access to the reply-to-all function. The second user's access to the reply-to-all function may be blocked, for example. In another embodiment, a warning message is provided to the second user when the second user attempts to send a message using the reply-to-all function, and the second user is provided an option to cancel the message. In another embodiment, a message sent by the second user is designated as spam.

In some embodiments, the first user is provided an option to provide a rating of the second user's use of the reply-to-all function when the first user accesses a message sent by the second user using the reply-to-all function.

Systems and apparatus implementing the methods described herein are also provided.

DETAILED DESCRIPTION

In exemplary embodiments, systems and methods for managing an electronic messaging system are provided. The electronic messaging system may be an email messaging system, for example. When a first user of the email messaging system accesses an email message generated and sent by a second user using a reply-to-all email function, the first user is provided an option to generate a rating of the second user's email etiquette. For example, the first user may be provided an option to indicate either that the second user has "Good Email Etiquette" or that the second user has "Bad Email Etiquette."

Average email etiquette values associated with various users are maintained in a table. When a first user's rating of a second user's use of the reply-to-all function is received, an average email etiquette value associated with the second user is updated, based on the first user's rating. The second user's subsequent access to and use of the reply-to-all function is controlled, based on the updated average email etiquette value associated with the second user. For example, if the second user's average email etiquette value is less than a predetermined limit, a warning may be provided to the second user when the second user next attempts to generate and send an email message using the reply-to-all function.

Figure 1:
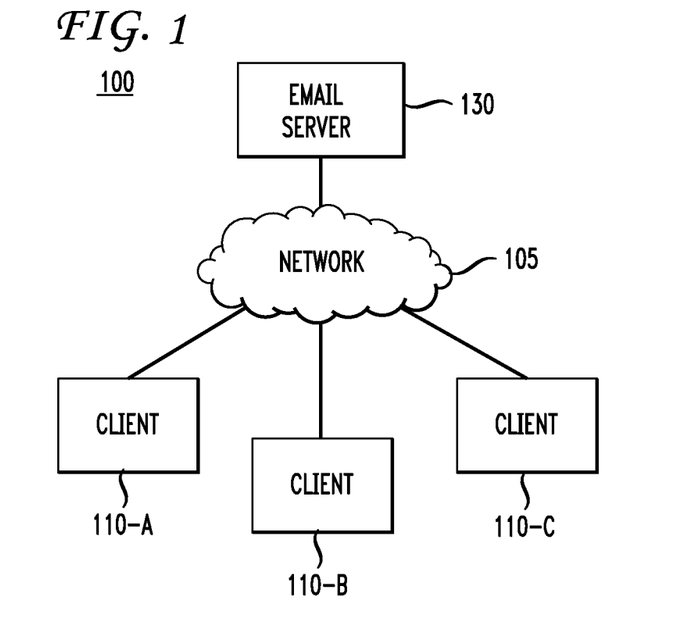
FIG. 1 illustrates a communication system that may be used to operate an email messaging system, in accordance with an exemplary embodiment.

FIG. 1 illustrates a communication system 100 that may be used to operate an email messaging system, in accordance with an exemplary embodiment. Communication system 100 includes a network 105, an email server 130 and one or more clients 110. Each client 110 may be a communication device, such as a computer, that is connected to network 105, for example. In other embodiments, communication system 100 may include other types of devices.

In the exemplary embodiment, users of clients 110 send email messages to, and receive email messages from, other users of network 105. In the example of FIG. 1, three clients 110-A, 110-B, and 110-C are shown; however, communication system 100 may include any number of clients. Any discussion herein referring to "client 110" may apply to any one, or all, of clients 110-A, 110-B, and 110-C.

Network 105 may comprise one or more of a number of different types of networks, such as, for example, an intranet, a local area network (LAN), a wide area network (WAN), an internet, Fibre Channel-based storage area network (SAN) or Ethernet. Other networks may be used. Alternatively, network 105 may comprise a combination of different types of networks.

Each client 110 comprises a communication device capable of transmitting and receiving email messages over network 105. For example, each client 110 may comprise a personal computer, a laptop computer, a workstation, a mainframe computer, a cellular telephone, a personal digital assistant, a Blackberry device, a pager, etc. In other embodiments, clients 110 may comprise other types of devices. Each client 110 may comprise software and/or hardware configured to provide functions relating to email messaging. Each client 110 may include a display device capable of displaying email messages to a user.

Each client 110 is connected to network 105, and has one or more network addresses. Each client 110 from time to time transmits email messages to email server 130, and receives email messages from email server 130. Transmission and receipt of email messages over a network are well-known.

Email server 130 manages email communications conducted by clients 110 and other devices over network 105. Accordingly, email server 130 from time to time receives an email message from a device on network 105, processes the email message, and transmits it to its intended recipient or recipients.

In one embodiment, communications between email server 130 and network 105 are conducted in accordance with IP protocols. Accordingly, in this embodiment, email server 130 receives from network 105 email messages formatted according to IP protocols. Other protocols may be used.

Email servers are well-known and may be implemented in various ways. In an exemplary embodiment illustrated in FIG. 2, email server 130 resides and operates on a computer 245 that is connected to network 105. Computer 245 may comprise any type of processing device, such as a personal computer, a workstation, mainframe computer, etc. Other types of processing devices may be used. Computer 245 comprises a processor 210, an interface 220, and a memory 235. Processor 210 controls various operations of computer 245 by executing computer program instructions which define such operations. Processor 210 may comprise hardware, software, or a combination of hardware and software. For example, in one embodiment, processor 210 comprises operating system software controlled by hardware, such as a central processing unit (CPU).

Figure 2:
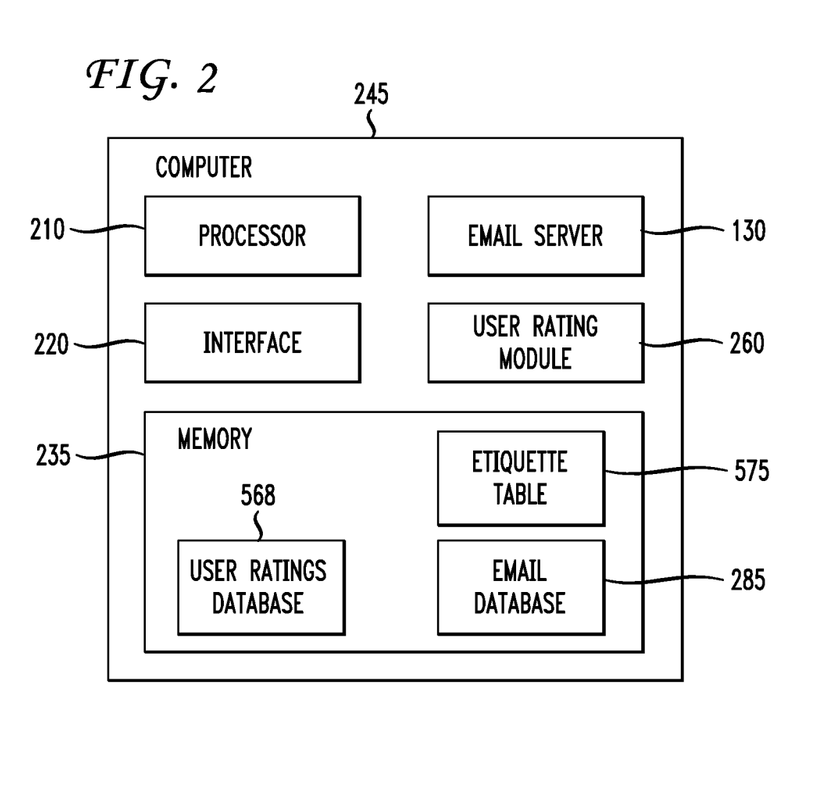
FIG. 2 shows examples of components of a computer, in accordance with an exemplary embodiment.

Interface 220 provides a communication gateway through which data may be transmitted between components of computer 245 and network 105. In various embodiments, interface 220 may be implemented using a number of different mechanisms, such as one or more enterprise systems connection cards, modems, or network interfaces. Other types of interfaces may be used.

Memory 235 is accessed by processor 210 and/or other components of computer 245 to store various types of information. For example, in one embodiment, email server 130 may cause one or more email messages to be stored in an email database 285. Memory 235 may comprise any one or more of a variety of different types of memory devices, such as random access memory (RAM), one or more disk drives, one or more optical disks, one or more tape drives, etc. Other types of memory devices may be used.

Email server 130 may comprise a software program that includes multiple modules or subroutines providing respective services or functions, for example. In other embodiments, email server 130 may comprise multiple software programs residing on one or more computers. In alternative embodiments, email server 130 may comprise hardware, or a combination of hardware and software. Email server 130 may comprise a computer readable medium, such as a magnetic disk, magnetic tape, or optical disk, that includes instructions in the form of computer code operable to perform various functions.

Email server 130 provides email functions and services to users of clients 110. In an exemplary embodiment, when a user of a client 110 invokes an email application, by selecting an appropriate option from a menu, for example, email server 130 causes an interface for generating and sending email messages to appear on a display device of client 110. In other embodiments, the interface may be generated by software or hardware operating on client 110.

Email server 130 receives email messages from clients 110, analyzes the email messages and transmits the messages via network 105 to their intended recipients. Email server 130 may also from time to time receive, via network 105, an email message directed to a client 110. In such case, email server 130 analyzes the email message and transmits the email message to the intended client 110. Some email messages may originate from other networks such as the Internet. Allowing users to generate and send an email message, receiving and analyzing an email message to determine an intended recipient(s), and directing an email message to its intended recipient(s), are well-known.

In the exemplary embodiment of FIG. 2, email server 130 stores email messages in email database 285. In a well-known manner, email server 130 may allow users of clients 110 to use a "mailbox" function to access their stored email messages. The mailbox function may be implemented by one or more software subroutines, for example.

Email server 130 provides several additional well-known functions. For example, when a first user operating a client 110 receives and accesses an email message from a second user, email server 130 provides an option to "reply" to the email. If the first user selects the "reply" option, email server 130 invokes a reply function to allow the first user to generate a reply email message and transmit the reply email message to the second user. Email server 130 also provides to the first user an option to generate a "reply-to-all" email message. If the first user selects the "reply-to-all" option, email server 130 invokes a reply-to-all function to allow the first user to generate a reply-to-all email message directed to the second user and to all other recipients of the original email received by the first user. Reply and reply-to-all email message functions are well-known.

In other embodiments, some of the functionality associated with certain email functions and services may be performed by software or hardware residing on client 110. For example, a software application residing on client 110 may perform some or all of the reply and reply-to-all email message functions.

Computer 245 also comprises a user rating module 260, which monitors email activity conducted on clients 110. When user rating module 260 detects that a first user of a client 110 receives and accesses an email message generated by a second user using the reply-to-all function, the user rating module 260 allows the first user to generate a rating of the second user's email etiquette. In some embodiments, user rating module 260 may remain in a dormant mode until it is activated by email server 130 when a first user of a client 110 accesses an email message generated by a second user using the reply-to-all function.

The user rating module 260 receives from users ratings of other users' email etiquette, and stores the ratings in a database. User ratings module 260 also maintains a table of average email etiquette values reflecting the various ratings that are received over time. An average email etiquette value associated with a particular user reflects other users' perceptions of that particular user's use of the reply-to-all email function.

User rating module 260 may also cause email server 130 to control a particular user's use of the reply-to-all function based on the user's current average email etiquette value. For example, if a particular user's average email etiquette value is currently less than a predetermined limit (indicating poor etiquette), user rating module 260 may provide a warning to the user when the user attempts to generate an email message using the reply-to-all function. In another embodiment, user rating module 260 may cause email server 130 to block a user's use of the reply-to-all function, preventing the user from generating any reply-to-all email messages, if the user's average email etiquette value is currently less than a predetermined limit.

User rating module 260 may comprise one or more software programs that reside and operate on computer 245. In other embodiments, user rating module 260 may comprise hardware, or a combination of hardware and software. User rating module 260 may comprise a computer readable medium, such as a magnetic disk, magnetic tape, or optical disk, that includes instructions in the form of computer code, for example. In some embodiments, user rating module 260 may be included within, or combined with, email server 130.

In other embodiments, computer 245 may comprise other applications in addition to those described above. For example, computer 245 may comprise database management software, firewall software, a web server, etc.

Figure 3A:
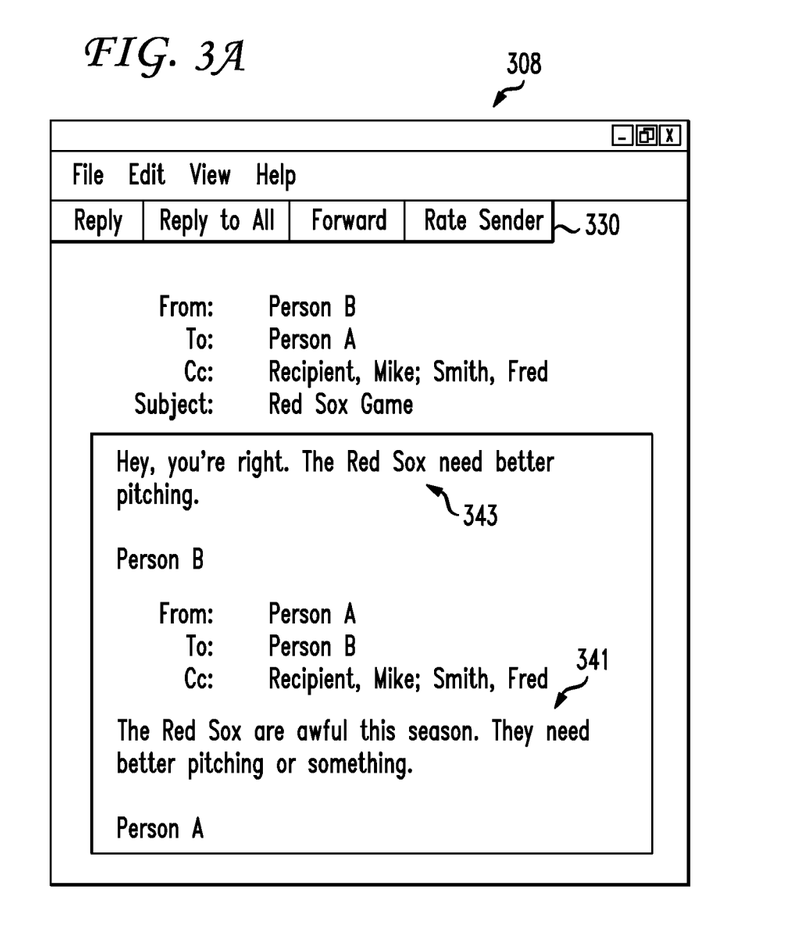
FIGS. 3A-3B show examples of an interface that may be used to conduct email messaging activities, in accordance with an exemplary embodiment.

FIG. 3A shows an example of an interface 308 that may be presented on a display device of a client 110, and be used to conduct email messaging activities, in accordance with an exemplary embodiment. In the illustrative example, interface 308 is invoked by an individual, Mike Recipient, to access and read his email messages and to conduct other email messaging activities. When he opens a particular email message 343 received from another individual, Person B, Mike Recipient sees a chain of email messages indicating that an exchange of email messages has taken place between Person B and a certain Person A. Specifically, Person A sent a first message 341 to Person B, of which copies were sent to Mike Recipient and to a certain Fred Smith. Person B replied to the first message 341 using the reply-to-all function, generating reply-to-all email message 343. The reply-to-all email message 343 was consequently sent not only to Person A but also to Mike Recipient and to Fred Smith.

Figure 4:
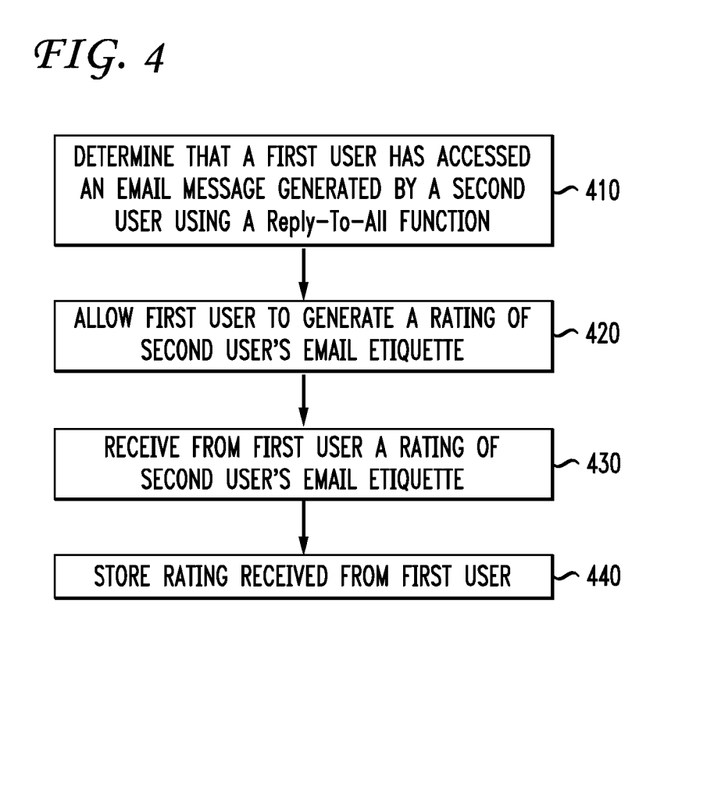
FIG. 4 is a flowchart of a method for allowing a first user to generate a rating of a second user's email etiquette, in accordance with an exemplary embodiment.

FIG. 4 is a flowchart of a method for allowing a first user to generate a rating of a second user's email etiquette in response to a reply-to-all email message sent by the second user, in accordance with an exemplary embodiment. At step 410, a determination is made that a first user has accessed an email message generated by a second user using a reply-to-all function. In the illustrative example, user rating module 260, in the course of monitoring email activities conducted at each of clients 110, detects that Mike Recipient has accessed reply-to-all email message 343 generated by Person B.

Figure 3B:
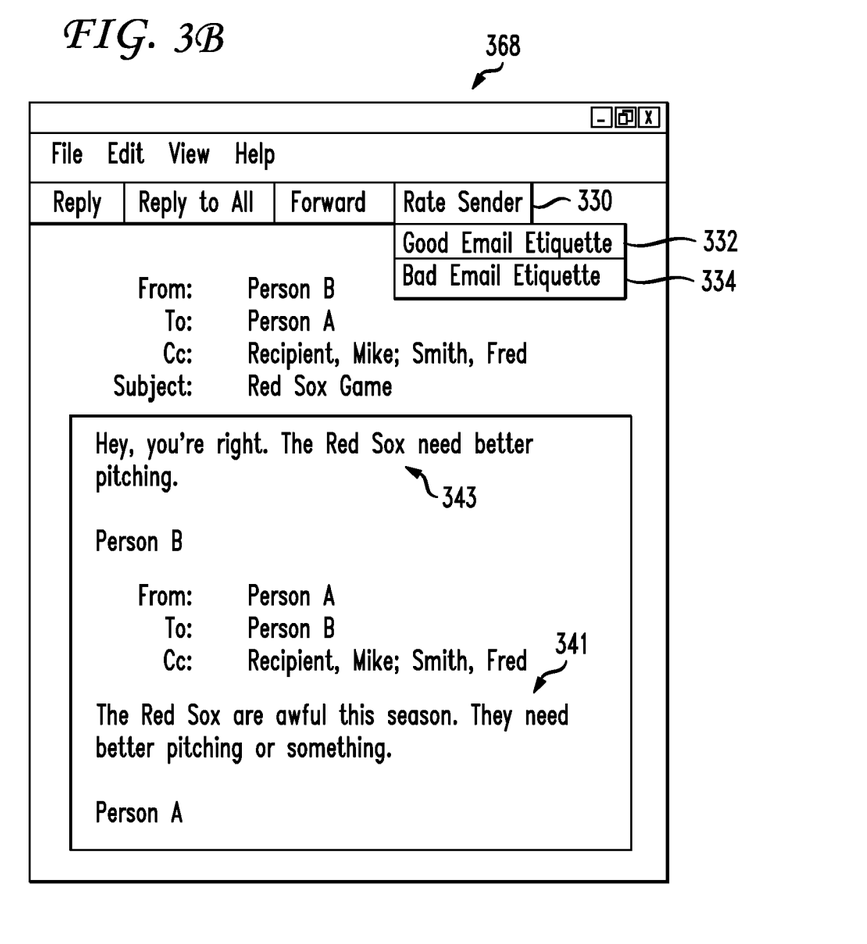

At step 420, the first user is allowed to generate a rating of the second user's email etiquette. Referring to FIG. 3A, user rating module 260 causes email server 130 to present a button 330 on interface 308 providing Mike Recipient an option to "Rate Sender." If Mike Recipient selects button 330, user rating module 260 causes two additional buttons 332 and 334 to appear, as shown in FIG. 3B, respectively allowing Mike Recipient to select a "Good Email Etiquette" rating or a "Bad Email Etiquette" rating. For example, if Mike Recipient believes that Person B has "Bad Email Etiquette," Mike Recipient may select button 334. In other embodiments, other rating options may be presented. If Mike Recipient selects one of buttons 332 or 334, information indicating his selected rating is transmitted to user rating module 260.

At step 430, a rating of the second user's email etiquette is received from the first user. Thus, user rating module 260 may receive information indicating Mike Recipient's selected rating of Person B's email etiquette. At step 440, the rating received from the first user is stored. Referring to FIG. 2, each rating received by user rating module 260, such as the rating received from Mike Recipient, may be stored in a user ratings database 568 in association with information including data identifying the user who generated the rating, the date and time received, etc.

In some embodiments, the method steps described in FIG. 4 are defined by computer program instructions that are stored in memory 235 of computer 245 and executed by processor 210. In one example, user rating module 260 and/or email server 130 comprises computer program instructions implemented as computer executable code appropriately programmed by one skilled in the art to perform the algorithm defined by the method steps described in FIG. 4. By executing the computer program instructions, processor 210 executes the algorithm defined by the method steps of FIG. 4.

Figure 5:
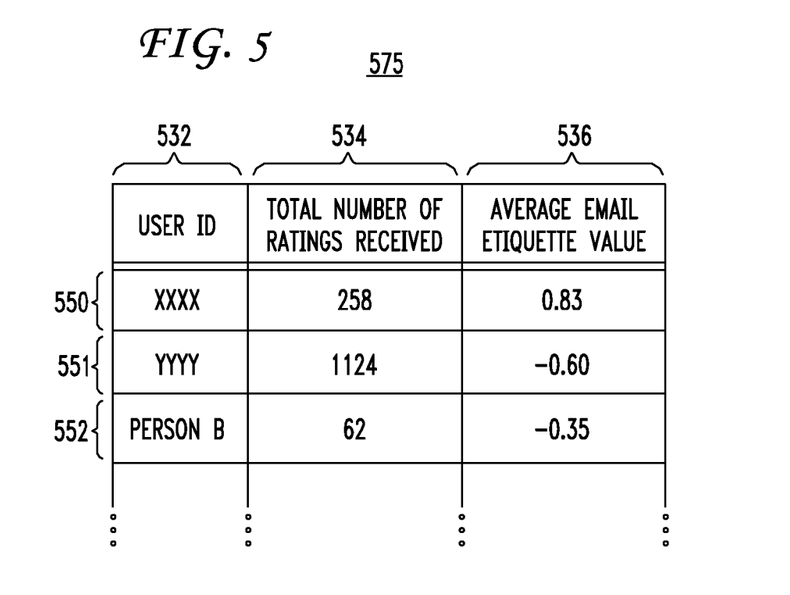
FIG. 5 is an example of an etiquette table, in accordance with an exemplary embodiment.

User rating module 260 also maintains an etiquette table 575 that stores average email etiquette values for various users. FIG. 5 is an example of an etiquette table 575, in accordance with an exemplary embodiment. Etiquette table 575 comprises a first column 532 which stores user identifiers ("user IDs") for respective users of clients 110. In some embodiments, etiquette table 575 may also store identifiers for users of other devices on network 105 or of devices on other networks. Etiquette table 575 also comprises a second column 534 which indicates the total number of ratings that have been received for each respective user listed in column 532. Etiquette table 575 further comprises a third column 536 holding an average email etiquette value for each respective user listed in column 532. A user's average email etiquette value, as indicated in column 536, represents an average of all ratings that have been received for that user. In other embodiments, other types of values may be computed based on user-generated ratings, and stored in various tables and/or databases.

Average email etiquette values may be determined by many different possible methods. In the exemplary embodiment, a "Good Email Etiquette" rating is associated with a numerical value of +1.0, and a "Bad Email Etiquette" rating is associated with a numerical value of −1.0. A user's average email etiquette value is determined by converting each rating received for the user to a numerical value, calculating a sum of such numerical values, and dividing the sum by the total number of ratings received. Thus, a user's average email etiquette value may be positive or negative.

Referring to etiquette table 575, record 550 stores a first user ID, "XXXX" which identifies a first user. Columns 534 and 536 indicate respectively that 258 ratings have been received for user "XXXX," and that the average email etiquette value for user "XXXX" is 0.83. Record 551 stores a second user ID, "YYYY" identifying a second user, and an average email etiquette value (−0.60) associated with the second user. Column 534 indicates that 1124 ratings have been received for user "YYYY." Record 552, which is associated with Person B, indicates that sixty-two (62) ratings have been received for Person B and that Person B's average email etiquette value is −0.35.

Figure 6:
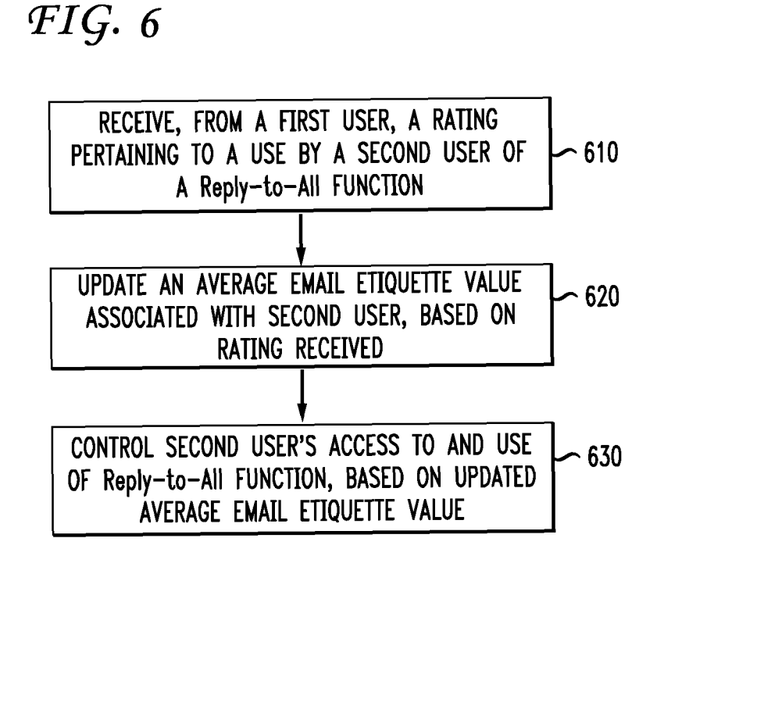
FIG. 6 is a flowchart of a method to control a user's use of a reply-to-all function based on an average email etiquette value, in accordance with an embodiment.

FIG. 6 is a flowchart of a method to control a user's use of a reply-to-all function based on an average email etiquette value associated with the user, in accordance with an exemplary embodiment. At step 610, a rating is received from a first user, pertaining to a use by a second user of a reply-to-all function provided by an email messaging system. In the illustrative example, user rating module 260 receives from Mike Recipient a rating of Person B's email etiquette, as discussed above.

Figure 7:
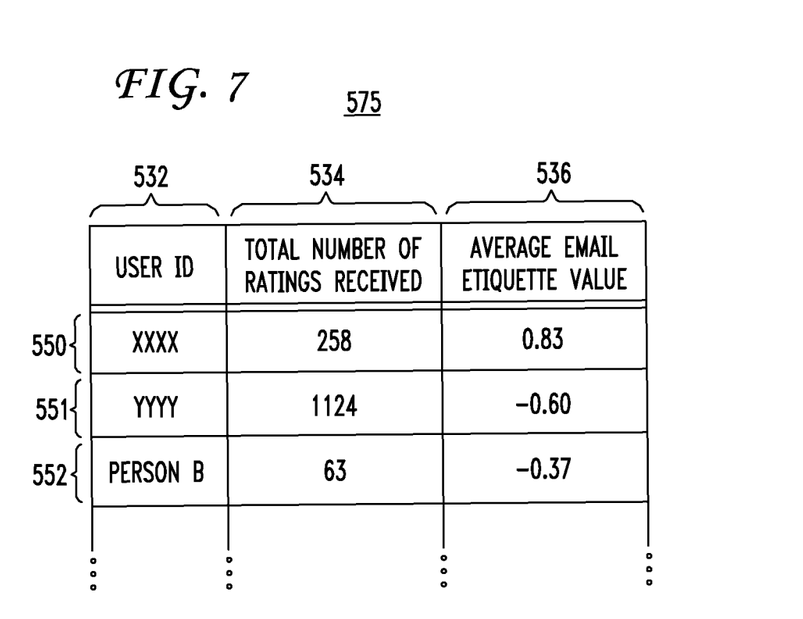
FIG. 7 is another example of an etiquette table, in accordance with an exemplary embodiment.

At step 620, an average email etiquette value associated with the second user is updated, based on the rating received at step 610. In the present example, user rating module 260 accesses etiquette table 575 (shown in FIG. 5), identifies record 552, which is associated with Person B, and updates the total number of ratings received, stored in column 534, and the average email etiquette value, stored in column 536. The average email etiquette value in column 536 is recalculated taking into account the new rating received from Mike Recipient. FIG. 7 shows etiquette table 575 after record 552 has been updated based on the rating received from Mike Recipient. Referring to columns 534 and 536, respectively, sixty-three (63) ratings pertaining to Person B have now been received, and Person B's updated average email etiquette value is −0.37.

At step 630, the second user's access to and use of the reply-to-all function is controlled, based on the updated average email etiquette value. In the exemplary embodiment, if a user having a negative average email etiquette value attempts to generate an email message using the reply-to-all function, user rating module 260 provides a warning to the user, before transmitting the email message. User rating module 260 also provides to the user an option to cancel the email message.

Figure 8:
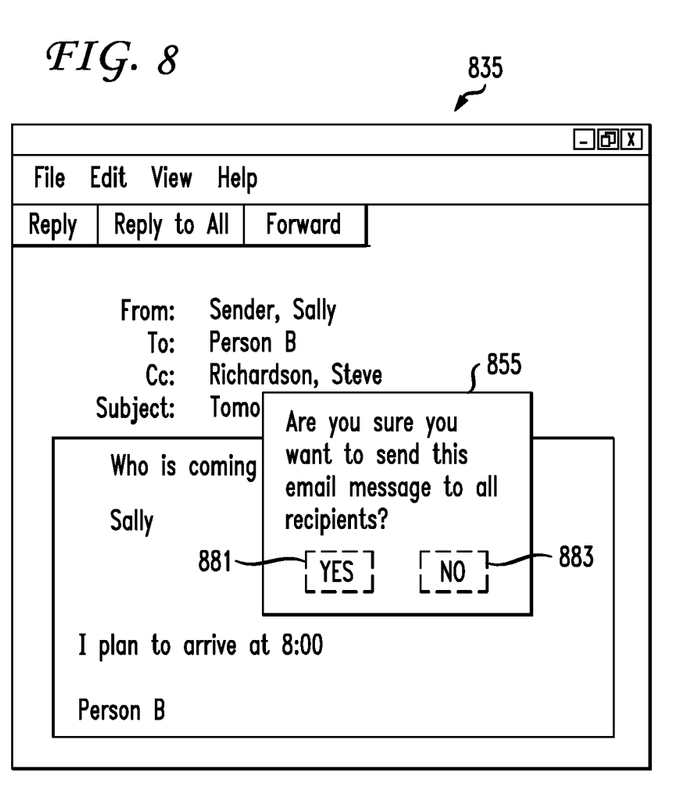
FIG. 8 shows an example of a warning that may appear on an interface, in accordance with an exemplary embodiment.

For example, suppose that Person B again attempts to generate an email message using the reply-to-all function. When user rating module 260 detects that Person B has attempted to use the reply-to-all function, user rating module 260 examines updated etiquette table 575, as shown in FIG. 7. Because the average email etiquette value associated with Person B is negative, user rating module 260 provides a warning to Person B before transmitting the email message. FIG. 8 shows an exemplary interface 835 and an example of a warning 855 that may be displayed on a client 110 operated by Person B, when Person B attempts to send a reply-to-all email message, in accordance with an exemplary embodiment. In addition to warning 855, Person B is also provided an option to select button 881 ("YES") if Person B does wish to proceed and transmit the reply-to-all email message, or button 883 ("NO") if Person B wishes to cancel the message. If Person B selects option 883, the reply-to-all email message is not transmitted.

In some embodiments, the method steps described in FIG. 6 are defined by computer program instructions that are stored in memory 235 of computer 245 and executed by processor 210. In one example, user rating module 260 and/or email server 130 comprises computer program instructions implemented as computer executable code appropriately programmed by one skilled in the art to perform the algorithm defined by the method steps described in FIG. 6. By executing the computer program instructions, processor 210 executes the algorithm defined by the method steps of FIG. 6.

In another embodiment, user rating module 260 may block a user's use of a reply-to-all function for a predetermined period of time, if the user attempts to send a reply-to-all email message and the user's average email etiquette value is negative. For example, user rating module 260 may display on the user's display device a message informing the user that the user is not permitted to send any reply-to-all email messages for twenty-four hours. In another embodiment, user rating module 260 may designate any reply-to-all email messages generated and sent by a particular user as spam, if that user's average email etiquette value is negative.

In other embodiments, systems and methods described herein may be used to manage electronic communications in other types of electronic messaging systems. For example, systems and methods described herein may be used to manage electronic communications in text messaging systems, SMS messaging systems, etc.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for managing an electronic messaging system, comprising:
   detecting that a first user of an electronic messaging system has accessed a message generated by a reply-to-all function used by a second user and that specifies the first user as a recipient;
   receiving a rating generated by the first user in response to receipt by the first user of the message that specifies the first user as a recipient, the rating comprising a measure by the first user of the second user's usage of the reply-to-all function;
   updating an average etiquette value associated with the second user, based on the rating, to generate an updated average etiquette value; and
   controlling access by the second user to the reply-to-all function, if the updated average etiquette value associated with the second user is below a predetermined limit,
   wherein the controlling access by the second user to the reply-to-all function comprises providing a warning message to the second user when the second user attempts to send a message using the reply-to-all function, and the second user is provided an option to cancel the message using the reply-to-all function.

2. The method of claim 1, wherein the electronic messaging system comprises an email messaging system.

3. The method of claim 1, wherein the controlling access by the second user to the reply-to-all function further comprises:
   restricting access by the second user to the reply-to-all function.

4. The method of claim 3, wherein the restricting access by the second user to the reply-to-all function comprises:
   blocking access by the second user to the reply-to-all function.

5. The method of claim 1, wherein the controlling access by the second user to the reply-to-all function comprises:
   designating a message sent by the second user as spam.

6. The method of claim 1, further comprising:
   providing to the first user an option to provide a rating of use by the second user of the reply-to-all function, when the first user accesses a message sent by the second user using the reply-to-all function.

7. The method of claim 6, further comprising:
   displaying on a display device of the first user two different ratings; and
   allowing the first user to select the rating of use by the second user of the reply-to-all function, from among the two different ratings.

8. A computer readable storage device storing computer program instructions for managing an electronic messaging system, which, when executed on a processor, cause the processor to perform operations comprising:
   detecting that a first user of an electronic messaging system has accessed a message generated by a reply-to-all function used by a second user and that specifies the first user as a recipient;

receiving a rating generated by the first user in response to receipt by the first user of the message that specifies the first user as a recipient, the rating comprising a measure by the first user of the second user's usage of the reply-to-all function;

updating an average etiquette value associated with the second user, based on the rating, to generate an updated average etiquette value; and controlling access by the second user of the reply-to-all function, if the updated average etiquette value associated with the second user is below a predetermined limit, wherein controlling the access by the second user to the reply-to-all function comprises providing a warning message to the second user when the second user attempts to send a message using the reply-to-all function, and the second user is provided an option to cancel the message using the reply-to-all function.

9. The computer readable storage device of claim 8, wherein the electronic messaging system comprises an email messaging system.

10. The computer readable storage device of claim 8, wherein the controlling access by the second user to the reply-to-all function further comprises:

restricting access by the second user to the reply-to-all function.

11. The computer readable storage device of claim 10, wherein the restricting access by the second user to the reply-to-all function comprises:

blocking access by the second user to the reply-to-all function.

12. The computer readable storage device of claim 8, wherein the controlling access by the second user to the reply-to-all function comprises:

designating a message sent by the second user as spam.

13. The computer readable storage device of claim 8, the operations further comprising:

providing to the first user an option to provide a rating of use by the second user of the reply-to-all function, when the first user accesses a message sent by the second user using the reply-to-all function.

14. The computer readable storage device of claim 13, the operations further comprising:

displaying on a display device of the first user two different ratings; and allowing the first user to select the rating of use by the second user of the reply-to-all function, from among the two different ratings.

15. An electronic messaging system comprising:

a processor to:

detect that a first user of the electronic messaging system has accessed a message generated by a reply-to-all function used by a second user and that specifies the first user as a recipient;

an interface to:

receive a rating generated by the first user in response to receipt by the first user of the message that specifies the first user as a recipient, the rating comprising a measure by the first user of the second user's usage of the reply-to-all function; and a memory to:

store an average etiquette value associated with the second user;

wherein the processor is further to:

update the average etiquette value associated with the second user, based on the rating, to generate an updated average etiquette value; and control access by the second user of the reply-to-all function, if the updated average etiquette value associated with the second user is below a predetermined limit, wherein controlling the access by the second user to the reply-to-all function comprises providing a warning message to the second user when the second user attempts to send a message using the reply-to-all function, and the second user is provided an option to cancel the message using the reply-to-all function.

16. The system of claim 15, wherein the electronic messaging system comprises an email messaging system.

\* \* \* \* \*